US012663503B2

(12) United States Patent
Loesch et al.

(10) Patent No.: US 12,663,503 B2
(45) Date of Patent: Jun. 23, 2026

(54) RADAR DEVICE AND METHOD FOR PRODUCING A RADAR DEVICE

(71) Applicant: Robert Bosch GmbH, Stuttgart (DE)

(72) Inventors: Benedikt Loesch, Stuttgart (DE); Klaus Baur, Mietingen (DE); Michael Schoor, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 490 days.

(21) Appl. No.: 18/046,413

(22) Filed: Oct. 13, 2022

(65) Prior Publication Data

US 2023/0137298 A1 May 4, 2023

(30) Foreign Application Priority Data

Nov. 3, 2021 (DE) ..................... 10 2021 212 378.3

(51) Int. Cl.
G01S 7/02 (2006.01)
G01S 7/03 (2006.01)
(52) U.S. Cl.
CPC ................ G01S 7/025 (2013.01); G01S 7/03 (2013.01)
(58) Field of Classification Search
CPC ...... H01Q 9/0485; H01Q 1/2283; H01Q 1/38; H01Q 23/00; H01Q 13/106; H01Q 9/045; H01Q 1/243; H01Q 1/3233; H01Q 1/523; H01Q 13/22; H01Q 21/005; H01Q 9/0457; H01P 3/18
See application file for complete search history.

(56) References Cited

U.S. PATENT DOCUMENTS

| | | | |
|---|---|---|---|
| 8,436,763 B2 | 5/2013 | Wintermantel | |
| 2008/0079632 A1* | 4/2008 | Jaeger | H01P 5/22 |
| | | | 342/194 |
| 2019/0107600 A1* | 4/2019 | Sion | G01S 13/931 |
| 2019/0324134 A1* | 10/2019 | Cattle | G01S 7/024 |

(Continued)

FOREIGN PATENT DOCUMENTS

| | | | | |
|---|---|---|---|---|
| CN | 106486766 A | * | 3/2017 | ......... H01Q 21/0006 |
| EP | 3336575 A1 | * | 6/2018 | ........... G01S 13/931 |

OTHER PUBLICATIONS

K. Wu, "Multi-dimensional and multi-functional substrate integrated waveguide antennas and arrays for GHz and THz applications: An emerging disruptive technology," 2013 7th European Conference on Antennas and Propagation (EuCAP), Gothenburg, Sweden, 2013, pp. 11-15. (Year: 2013).*

*Primary Examiner* — Vladimir Magloire
*Assistant Examiner* — Peter Davon Doze
(74) *Attorney, Agent, or Firm* — NORTON ROSE FULBRIGHT US LLP

(57) ABSTRACT

A radar device having a plurality of transmit antennas and a plurality of receive antennas. The radar device further comprises at least one high-frequency (HF) radar chip which is configured to generate a high-frequency signal and transmit it via the transmit antennas. The transmit antennas have an offset with respect to the receive antennas in a first direction and at least one transmit antenna has an overlap with at least one receive antenna in a second direction. The first direction is a vertical direction and the second direction a horizontal direction. Alternatively, the first direction is a horizontal direction and the second direction a vertical direction.

12 Claims, 3 Drawing Sheets

(56) References Cited

U.S. PATENT DOCUMENTS

2019/0391230 A1* 12/2019 Loesch ................... G01S 13/42
2021/0194115 A1* 6/2021 Wintermantel ..... G01S 13/4454
2023/0003870 A1* 1/2023 Kishigami ............ G01S 13/584

* cited by examiner

RADAR DEVICE AND METHOD FOR PRODUCING A RADAR DEVICE

CROSS REFERENCE

The present application claims the benefit under 35 U.S.C. § 119 of German Patent Application No. DE 10 2021 212 378.3 filed on Nov. 3, 2021, which is expressly incorporated herein by reference in its entirety.

FIELD

The present invention relates to a radar device and to a method for producing a radar device.

BACKGROUND INFORMATION

In addition to distance and relative speed, the azimuth and elevation angles are also of great significance for environment monitoring in driver assistance systems, since they can be used for lane assignment and for making a statement regarding the relevance of the target. In this way, it can be determined whether it is possible to drive over, up to or under an object.

The azimuth and elevation angles of targets can be determined from amplitude and/or phase differences of an antenna array's transmit and/or receive antennas. The MIMO (multiple input multiple output) principle can be used to improve the accuracy and separation capability of angle estimation. In contrast to conventional SIMO (single input multiple output) radars with one transmit antenna and a plurality of receive antennas, a plurality of transmit antennas and a plurality of receive antennas are used for this purpose.

During angle estimation, the receive signals are compared with a previously measured angle-dependent antenna diagram. In the event that only one target is located in a (d,v) cell, with d denoting distance and v relative speed, the estimated angle is obtained as the position of the best match between receive signal and antenna diagram.

U.S. Pat. No. 8,436,763 B2 describes a MIMO radar sensor which uses the MIMO principle with code-division multiplexing and two transmit antennas to improve azimuth angle estimation. The two transmit antennas are here respectively arranged at the left-hand or right-hand edges of the overall array in order to achieve the largest possible virtual aperture.

Implementing the antennas in planar technology requires space on the printed circuit board for the antenna feed line from the one or more high-frequency components to the antennas. This enlarges the overall dimensions of the antenna array.

Radar sensors are generally installed in the vehicle in concealed manner. The required zone in which no interfering vehicle parts may be located plays a major role here. The required clearance zone is generally described by a "radar installation cone", the dimensions of which are directly related to the overall dimensions of the antenna array. It is therefore advantageous to keep the radar installation cone as small as possible.

SUMMARY

The present invention provides a radar device and a method for producing a radar device.

Advantageous developments and embodiments of the present invention are disclosed herein.

According to a first aspect, the present invention relates to a radar device. According to an example embodiment of the present invention, the radar device has a plurality of transmit antennas and a plurality of receive antennas. The radar device further comprises at least one high-frequency (HF) radar chip which is configured to generate a high-frequency signal and transmit it via the transmit antennas. The transmit antennas have an offset with respect to the receive antennas in a first direction and at least one transmit antenna has an overlap with at least one receive antenna in a second direction. The first direction is a vertical direction and the second direction a horizontal direction. Alternatively, the first direction is a horizontal direction and the second direction a vertical direction.

According to a second aspect, the present invention relates to a method for producing a radar device. According to an example embodiment of the present invention, in the method, a plurality of transmit antennas and a plurality of receive antennas are formed. At least one HF radar chip is used which is configured to generate a high-frequency signal and transmit it via the transmit antennas. The transmit antennas and receive antennas are arranged such that the transmit antennas have an offset with respect to the receive antennas in a first direction and at least one transmit antenna has an overlap with at least one receive antenna in a second direction. The first direction is a vertical direction and the second direction a horizontal direction. Alternatively, the first direction is a horizontal direction and the second direction a vertical direction.

The present invention provides a compact MIMO radar sensor combining robust and unambiguous azimuth and elevation estimation with the smallest possible radar installation cone and box volume.

According to a further embodiment of the radar device of the present invention, the transmit antennas are arranged above or below the receive antennas. This enables small phase center spacings in the virtual array and at the same time the radar sensor remains compact in the horizontal direction. Such an arrangement allows horizontally overlapping antennas to be obtained, which would not be possible without the vertical offset between transmit and receive antennas or only by arranging the transmit array horizontally adjacent to the receive array, which would result in a larger dimension of the radar sensor in the horizontal direction.

According to a further embodiment of the radar device of the present invention, the at least one HF radar chip is placed centrally between the transmit antennas and the receive antennas, which allows the feed lines from the at least one HF radar chip to the transmit and receive antennas to be short.

The transmit and receive antennas are preferably not implemented in planar antenna technology with the high-frequency component on the same side of a printed circuit board.

According to a further embodiment of the radar device of the present invention, the latter has a substrate, for instance a printed circuit board, wherein the transmit antennas and receive antennas are arranged on a first side of the substrate (for instance an upper face of the printed circuit board), and wherein the at least one HF radar chip is arranged on a second side of the substrate (for instance a back face of the printed circuit board).

According to a further embodiment of the radar device of the present invention, the transmit antennas and the receive antennas take the form of microstrip antennas (planar antennas), wherein the at least one HF radar chip is preferably arranged on the back face of a printed circuit board and the transmit antennas and receive antennas are arranged on an upper face of the printed circuit. A feed network for the antennas can be arranged on the back face or front face of the printed circuit board. An HF via or HF through-coupling through the printed circuit board may further be provided in order to couple the transmit antennas and receive antennas on the upper face of the printed circuit board with the at least one HF radar chip.

According to a further embodiment of the radar device of the present invention, the transmit antennas and receive antennas take the form of substrate-integrated waveguide (SIW) antennas. Preferably, the at least one HF radar chip is arranged on the back face of a printed circuit board and the transmit antennas and receive antennas are arranged on an upper face of the printed circuit board.

According to a further embodiment of the radar device of the present invention, SIW antennas comprise multilayer SIW waveguide structures. According to further embodiments, the SIW antennas may also be of single-layer configuration.

According to a further embodiment of the radar device of the present invention, the transmit antennas and receive antennas take the form of dielectric resonator antennas (DRA). This type of antenna consists of dielectric cylinders adhesively bonded onto a printed circuit board. The antenna elements offer a higher antenna gain per occupied area and thus require distinctly less space despite similar directional characteristics, in particular in the vertical direction. With this antenna technology, the at least one HF radar chip can be arranged either on the same or on the opposite side of the printed circuit board as the transmit antennas and receive antennas.

According to a further embodiment of the radar device of the present invention, the transmit antennas and receive antennas take the form of waveguide antennas. According to one embodiment, the at least one HF radar chip can be arranged on an upper face of a printed circuit board, a feed network can be arranged on a high-frequency substrate on an upper face of the printed circuit board and a waveguide coupler (launcher) can likewise be arranged on the HF substrate. According to a further embodiment, the at least one HF radar chip can be arranged on the back face of the printed circuit board and be connected by way of a via or through-coupling to a feed network on the high-frequency substrate on the upper face of the printed circuit board. A waveguide coupler is furthermore arranged on the HF substrate.

According to a further embodiment of the present invention, the at least one HF radar chip is located with the waveguide coupler in a package on an upper face or on a lower face of the printed circuit board, wherein a feed line is formed in the waveguide. In the case of placement on the lower face of the printed circuit board, the waveguide coupling structure radiates through a suitable opening through the printed circuit board which can additionally be laterally metallized. Alternatively, it radiates through an at least radar-transparent zone in the printed circuit board into the waveguide.

The waveguide technology may use inexpensive single-layer waveguides or somewhat costlier multilayer waveguides. In the case of a single-layer waveguide design, the antenna feed network requires a similar amount of space as with planar antennas. Multilayer waveguide designs offer advantages with regard to feeding the antennas which favor a compact implementation of the antenna array.

All the stated embodiments result in its being possible to arrange the transmit antennas and receive antennas more compactly, since either no feed lines interfere with placement, the transmit antennas and receive antennas themselves require less area or the HF radar chip and the transmit antennas and receive antennas can lie one above the other and no longer have to be adjacent to each other.

In particular in the vertical direction, it is in this way possible to achieve a distinct reduction in the overall antenna area for the transmit antennas and receive antennas. The size of the clearance zone required for vehicle integration is largely dependent on the overall antenna area. However, only the relative antenna positions between all the transmit antennas and between all the receive antennas are of relevance to the detection and angle estimation performance of the radar device and not the positioning of the transmit antennas relative to the receive antennas. The more compact arrangement with one of the above embodiments thus does not result in degradation of sensor performance.

According to a further embodiment of the radar device of the present invention, the at least one HF radar chip is configured to drive the transmit antennas using a time-division multiplexing method.

According to a further embodiment of the radar device of the present invention, the at least one HF radar chip is configured to drive the transmit antennas using a Doppler-division multiple access method, a frequency-division multiplexing method, a code-division multiplexing method with random codes or an orthogonal frequency-division multiplexing method.

Further advantages, features and details of the present invention are revealed by the following description, in which various exemplary embodiments are described in detail with reference to the figures.

In all the figures, identical or functionally identical elements and devices are provided with the same reference signs. The numbering of method steps is for clarity and is not in general intended to imply any particular chronological order. In particular, a number of method steps may also be carried out simultaneously.

DETAILED DESCRIPTION OF EXAMPLE EMBODIMENTS

Figure 1:
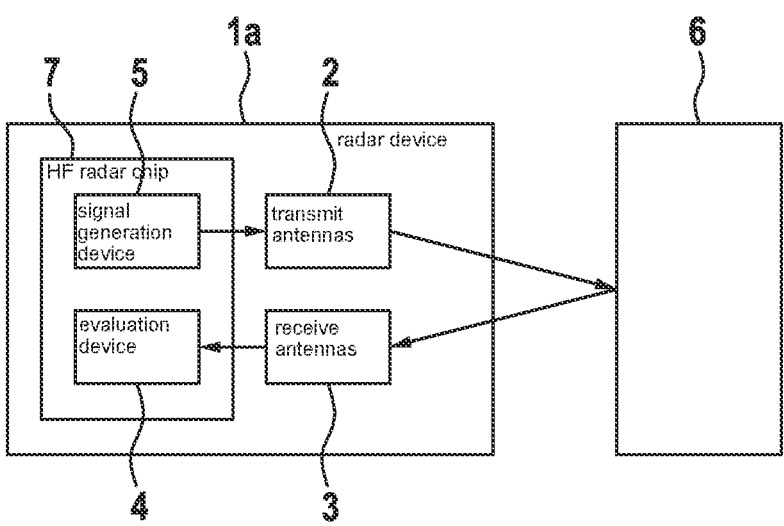
FIG. 1 shows a schematic block diagram of a radar device according to one example embodiment of the present invention.

FIG. 1 shows a schematic block diagram of a radar device 1a with a plurality of transmit antennas 2 and a plurality of receive antennas 3. The invention is not limited to a specific number of transmit antennas 2 and receive antennas 3.

The radar device 1a further comprises at least one HF radar chip 7 which for instance takes the form of a monolithic microwave integrated circuit (MMIC). The at least one HF radar chip 7 generates a high-frequency signal which is transmitted via the transmit antennas 2. The transmit antennas 2 have an offset with respect to the receive antennas 3 in a first direction. This may be taken to mean that a phase center of the transmit antennas 2 is offset with respect to the phase centers of the receive antennas 3 in the first direction. Portions of the transmit antennas 2 may, however, still overlap in the first direction (i.e. only with regard to the extent in the first direction) with portions of the receive antennas 3. According to further embodiments, the transmit antennas 2 and receive antennas 3 are arranged such that there is no overlap along the first direction.

There is furthermore at least one transmit antenna 2 which has an overlap with at least one receive antenna 3 in a second direction. The first direction is preferably a vertical direction and the second direction a horizontal direction. Alternatively, the first direction is a horizontal direction and the second direction a vertical direction.

The at least one HF radar chip 7 comprises a signal generation device 5 which generates the HF signal and transmits it via the transmit antennas 2. The at least one HF radar chip 7 furthermore comprises an evaluation device 4 which evaluates the radar signals received by the receive antennas 3.

Figure 2:
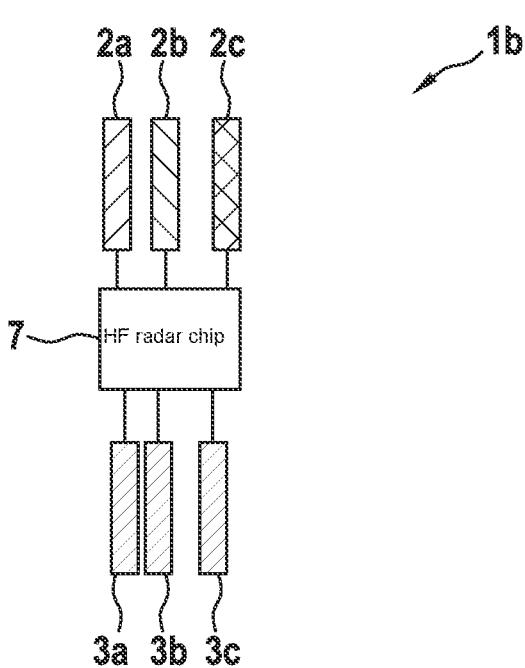
FIG. 2 shows a schematic plan view of a radar device according to one example embodiment of the present invention.

FIG. 2 shows a schematic plan view of a radar device 1b which comprises three transmit antennas 2a-2c and three receive antennas 3a-3c. The transmit antennas 2a-2c are here arranged above the receive antennas 3a-3c, with an HF radar chip 7 being located in the center. In this embodiment, the HF radar chip 7 is arranged on the same side of a printed circuit board as the transmit antennas 2a-2c and the receive antennas 3a-3c. The transmit antennas 2a-2c and receive antennas 3a-3c are for example waveguide antennas or dielectric resonator antennas. The transmit antennas 2a-2c and receive antennas 3a-3c may also be SIW antennas or microstrip antennas. The first transmit antenna 2a has an overlap with the first receive antenna 3a in the horizontal direction. The second transmit antenna 2b furthermore has an overlap with the second receive antenna 3b in the horizontal direction and the third transmit antenna 2c has an overlap with the third receive antenna 3c in the horizontal direction.

Figure 3:
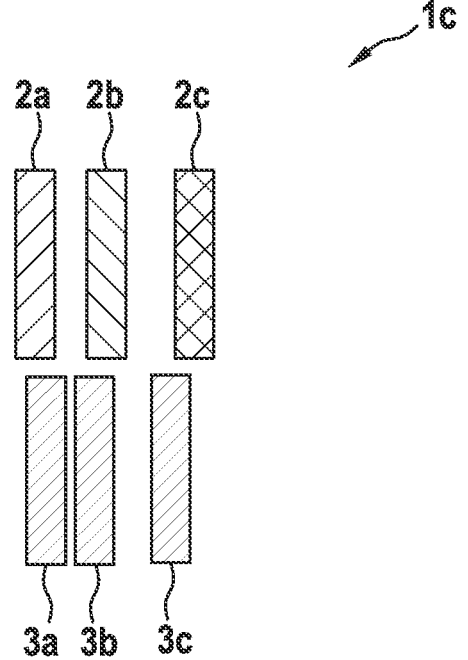
FIG. 3 shows a schematic plan view of a radar device according to a further example embodiment of the present invention.

FIG. 3 shows a schematic plan view of a further radar device 1c. This radar device differs from the radar device 1b shown in FIG. 2 in particular in that the HF radar chip is arranged on a back face of a printed circuit board, while the transmit antennas 2a-2c and the receive antennas 3a-3c are arranged on the upper face of the printed circuit board. The transmit antennas 2a-2c and receive antennas 3a-3c may be, for example, microstrip antennas, SIW antennas, DRA antennas or waveguide antennas.

Figure 4:
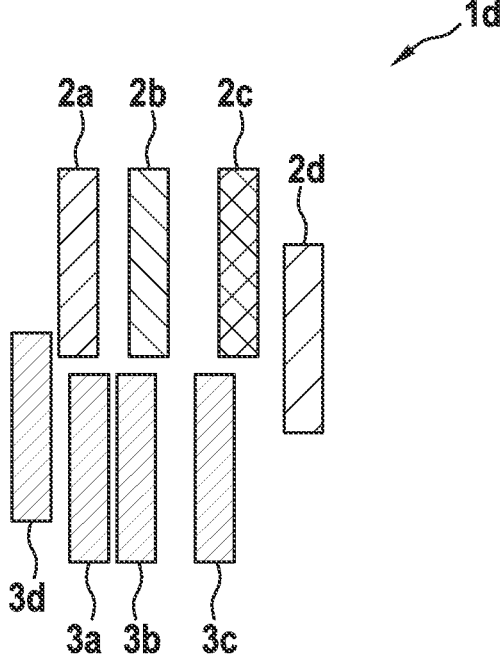
FIG. 4 shows a schematic plan view of a radar device according to a further example embodiment of the present invention.

FIG. 4 shows a schematic plan view of a further radar device 1d. In contrast to the radar device 1c shown in FIG. 3, a further transmit antenna 2d is provided which is vertically offset relative to the other transmit antennas 2a-2c arranged horizontally adjacent one another. An additional receive antenna 3d is furthermore provided which is vertically offset relative to the other receive antennas 3a-3c arranged horizontally adjacent one another. The radar device 1d can consequently determine an elevation angle. The transmit antenna 2d and the receive antenna 3d which are in each case offset are respectively located laterally adjacent the remaining transmit antennas 2a-2c and receive antennas 3a-3c.

Figure 5:
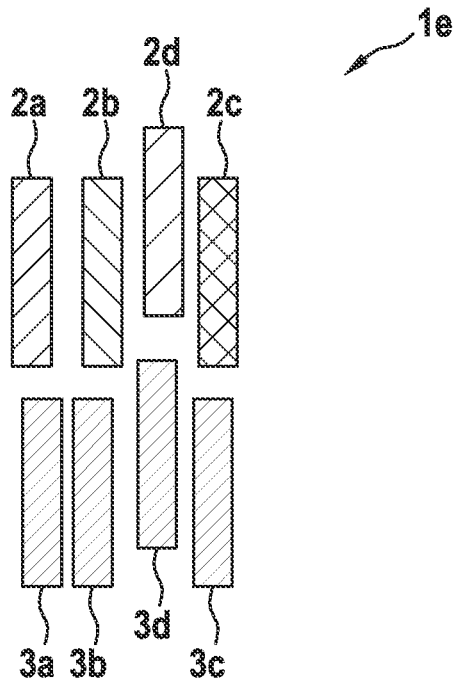
FIG. 5 shows a schematic plan view of a radar device according to a further example embodiment of the present invention.

FIG. 5 shows a schematic plan view of a further radar device 1e. In contrast to the arrangement shown in FIG. 4, the transmit antenna 2d and receive antenna 3d which are in each case offset are respectively located between two of the remaining transmit antennas 2a-2c or receive antennas 3a-3c.

During operation of one of the MIMO radar devices 1a-1e shown in FIGS. 1 to 5, the transmit signals are transmitted orthogonally to one another. The HF radar chip 7 is here configured to use an appropriate modulation method. Possible modulation methods comprise time-division multiplexing (TDM), Doppler-division multiple access (DDM), frequency-division multiplexing (FDM), code-division multiplexing with random codes (PN, CDM) and orthogonal frequency-division multiplexing (OFDM). Except for time-division multiplexing, transmit antennas 2; 2a-2d are simultaneously active, which boosts the signal-to-noise ratio.

Figure 6:
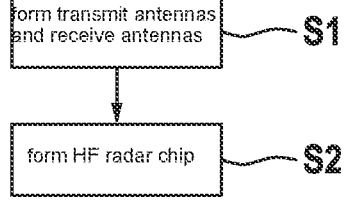
FIG. 6 shows a flow chart of a method for producing a radar device according to one example embodiment of the present invention.

FIG. 6 shows a flow chart of a method for producing a radar device, in particular one of the above-described radar devices 1a to 1e.

Transmit antennas 2; 2a-2d and receive antennas 3; 3a-3d are here formed, S1. At least one HF radar chip 7 which generates a high-frequency signal and transmits it via the transmit antennas 2; 2a-2d is furthermore formed, S2. The transmit antennas 2; 2a-2d have an offset with respect to the receive antennas 3; 3a-3d in a first direction and at least one transmit antenna 2; 2a-2d has an overlap with at least one receive antenna 3; 3a-3d in a second direction. The first direction is a vertical direction and the second direction a horizontal direction. Alternatively, the first direction is a horizontal direction and the second direction a vertical direction.

The transmit antennas 2; 2a-2d and receive antennas 3; 3a-3d may be, for example, microstrip antennas, SIW antennas, dielectric resonator antennas or waveguide antennas. In the case of microstrip antennas and SIW antennas, the at least one HF radar chip 7 is preferably arranged on another side of a printed circuit board than the transmit antennas 2; 2a-2d and receive antennas 3; 3a-3d. For the other types of antenna, the at least one HF radar chip 7 may be arranged on the same side as or on another side of a printed circuit board than the transmit antennas 2; 2a-2d and receive antennas 3; 3a-3d.

What is claimed is:

1. A radar device, comprising:

a plurality of transmit antennas including a first transmit antenna, a second transmit antenna, a third transmit antenna, and a fourth transmit antenna;

a plurality of receive antennas including a first receive antenna, a second receive antenna, a third receive antenna, and a fourth receive antenna;

at least one high-frequency (HF) radar chip configured to generate a high-frequency signal and transmit it via the plurality of transmit antennas; and a substrate, wherein the plurality of transmit antennas and the plurality of receive antennas are arranged on a first side of the substrate, and wherein the at least one HF radar chip is arranged on a second side of the substrate;

wherein a first subset of antennas comprises the first transmit antenna, the second transmit antenna, and the third transmit antenna, each antenna of the first subset of antennas being aligned in a first direction and offset from each other antenna in the first subset of antennas in a second direction;

wherein a second subset of antennas comprises the first receive antenna, the second receive antenna, and the third receive antenna, each antenna of the second subset of antennas being aligned in the first direction and offset from each other antenna in the second subset of antennas in the second direction; and wherein the first subset of antennas and the second subset of antennas are situated between the fourth transmit antenna and the fourth receive antenna in the second direction;

wherein the at least one HF radar chip is connected to the plurality of transmit antennas and the plurality of receive antennas via through-coupling to a feed network, wherein the feed network is arranged on the second side of the substrate;

wherein the at least one HF radar chip is a monolithic microwave integrated circuit (MMIC).

2. The radar device as recited in claim 1, wherein the plurality of transmit antennas and the plurality of receive antennas are in the form of microstrip antennas.

3. The radar device as recited in claim 1, wherein the plurality of transmit antennas and the plurality of receive antennas are in the form of substrate-integrated waveguide (SIW) antennas.

4. The radar device as recited in claim 3, wherein the SIW antennas include multilayer SIW waveguide structures.

5. The radar device as recited in claim 1, wherein the plurality of transmit antennas and the plurality of receive antennas are in the form of dielectric resonator antennas.

6. The radar device as recited in claim 1, wherein the plurality of transmit antennas and the plurality of receive antennas are in the form of waveguide antennas.

7. The radar device as recited in claim 1, wherein the at least one HF radar chip is configured to drive the plurality of transmit antennas using a time-division multiplexing method.

8. The radar device as recited in claim 1, wherein the at least one HF radar chip is configured to drive the plurality of transmit antennas using a Doppler-division multiple access method or a frequency-division multiplexing method or a code-division multiplexing method with random codes or an orthogonal frequency-division multiplexing method.

9. A method for producing a radar device, comprising the following steps:

forming a plurality of transmit antennas and a plurality of receive antennas, the plurality of transmit antennas including a first transmit antenna, a second transmit antenna, a third transmit antenna, and a fourth transmit antenna, and the plurality of receive antennas including a first receive antenna, a second receive antenna, a third receive antenna, and a fourth receive antenna;

forming at least one high-frequency (HF) radar chip configured to generate a high-frequency signal and transmit it via the transmit antennas; and forming a substrate, wherein the plurality of transmit antennas and the plurality of receive antennas are arranged on a first side of the substrate, and wherein the at least one HF radar chip is arranged on a second side of the substrate;

wherein a first subset of antennas comprises the first transmit antenna, the second transmit antenna, and the third transmit antenna, each antenna of the first subset of antennas being aligned in a first direction and offset from each other antenna in the first subset of antennas in a second direction;

wherein a second subset of antennas comprises the first receive antenna, the second receive antenna, and the third receive antenna, each antenna of the second subset of antennas being aligned in the first direction and offset from each other antenna in the second subset of antennas in the second direction; and wherein the first subset of antennas and the second subset of antennas are situated between the fourth transmit antenna and the fourth receive antenna in the second direction;

wherein the at least one HF radar chip is connected to the plurality of transmit antennas and the plurality of receive antennas via through-coupling to a feed network, wherein the feed network is arranged on the second side of the substrate;

wherein the at least one HF radar chip is a monolithic microwave integrated circuit (MMIC).

10. The radar device as recited in claim 1, wherein the substrate further comprises a waveguide coupler arranged on the second side of the substrate, and wherein a feed line is formed in the waveguide coupler.

11. The method for producing a radar device as recited in claim 9, wherein the substrate further comprises a waveguide coupler arranged on the second side of the substrate, and wherein a feed line is formed in the waveguide coupler.

12. The radar device as recited in claim 1, wherein the fourth transmit antenna is offset from the first subset of antennas in the first direction by a first predetermined distance, and wherein the fourth receive antenna is offset from the second subset of antennas in the first direction by a second predetermined distance.

* * * * *